US007761515B2

(12) United States Patent
Denninghoff

(10) Patent No.: US 7,761,515 B2
(45) Date of Patent: Jul. 20, 2010

(54) GROUP INTERCOM, DELAYED PLAYBACK, AND AD-HOC BASED COMMUNICATIONS SYSTEM AND METHOD

(75) Inventor: Karl Denninghoff, Bothell, WA (US)

(73) Assignee: Intel Corporation, Santa Clara, CA (US)

(*) Notice: Subject to any disclaimer, the term of this patent is extended or adjusted under 35 U.S.C. 154(b) by 1365 days.

(21) Appl. No.: 10/958,528

(22) Filed: Oct. 5, 2004
(Under 37 CFR 1.47)

(65) Prior Publication Data
US 2008/0155689 A1 Jun. 26, 2008

Related U.S. Application Data

(63) Continuation-in-part of application No. 10/943,112, filed on Sep. 16, 2004, now Pat. No. 7,239,253, and a continuation-in-part of application No. 10/943,107, filed on Sep. 16, 2004.

(60) Provisional application No. 60/509,282, filed on Oct. 6, 2003, provisional application No. 60/504,169, filed on Sep. 18, 2003, provisional application No. 60/504,421, filed on Sep. 18, 2003.

(51) Int. Cl.
G06F 15/16 (2006.01)
(52) U.S. Cl. .................................... 709/205
(58) Field of Classification Search ................ 709/205
See application file for complete search history.

(56) References Cited

U.S. PATENT DOCUMENTS 6,718,394 B2 * 4/2004 Cain .......................... 709/242
6,816,910 B1 * 11/2004 Ricciulli ..................... 709/237
6,993,587 B1 * 1/2006 Basani et al. ............... 709/229
7,382,762 B2 * 6/2008 Chmora et al. ............. 370/342
7,421,578 B1 * 9/2008 Huang et al. ................ 713/163
2001/0003191 A1 6/2001 Kovacs et al.
2003/0008641 A1 1/2003 Ramakesavan
2005/0059379 A1 3/2005 Sovio et al.
2005/0090201 A1 4/2005 Lengies et al.
2006/0221915 A1 10/2006 Gatta et al.

FOREIGN PATENT DOCUMENTS

| JP | 11239150 | 8/1999 |
| JP | 2000165930 | 6/2000 |
| JP | 2001285345 | 10/2001 |
| JP | 2002359623 | 12/2002 |

OTHER PUBLICATIONS

PCT International Search Report (dated May 3, 2007), International Application No. PCT/US04/33280, 7 pgs.
Examination Report from GB0608511.2 mailed Jul. 2, 2007, 2 pgs.
International Preliminary Report on Patentability from PCT/US2004/033280 mailed Jun. 7, 2007, 5 pgs.
Notice of Reasons for Rejection from 2006-534393 mailed Jan. 6, 2009, 3 pgs.
Ramanujan, R., et al., Intrusion-Resistant Ad Hoc Wireless Networks, MILCOM 2002. Proceedings, Oct. 2002, vol. 2, 7 pgs.
Tada, Y., et al., An Active Direction System by Music, Japan Advanced Institute of Science & Technology, vol. 2000, No. 94, Oct. 2000, 12 pgs.

* cited by examiner

Primary Examiner—J Bret Dennison
(74) Attorney, Agent, or Firm—Blakely, Sokoloff, Taylor & Zafman LLP

(57) ABSTRACT

An ad hoc wireless communications system and method permits a group of wireless portable communications devices to communicate with each other. The ad hoc network has security systems. A server for the ad hoc network is selected from among the portable communications devices associated with the ad hoc network.

19 Claims, 11 Drawing Sheets

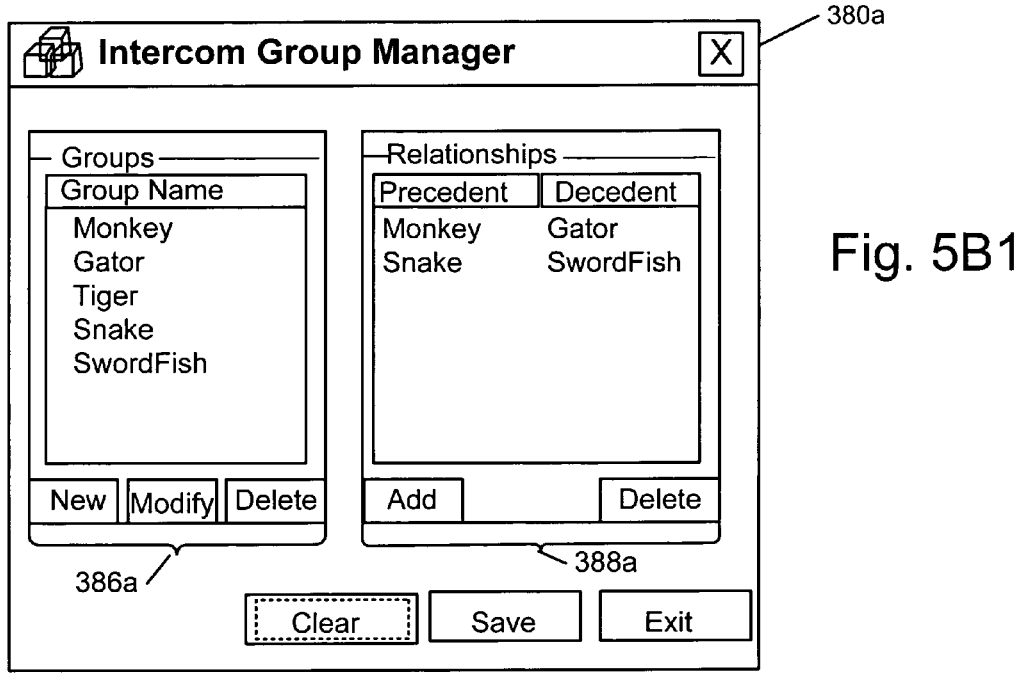
Fig. 5B1
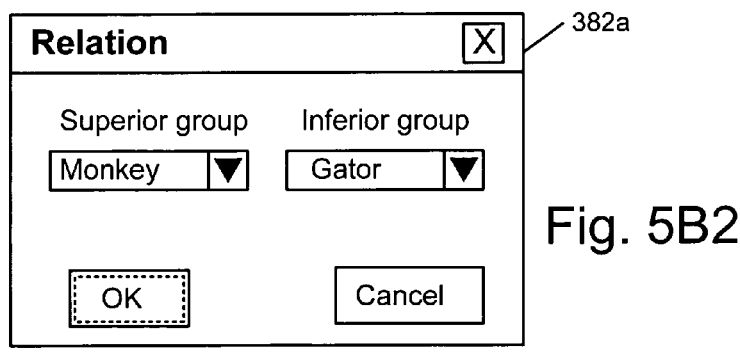
Fig. 5B2
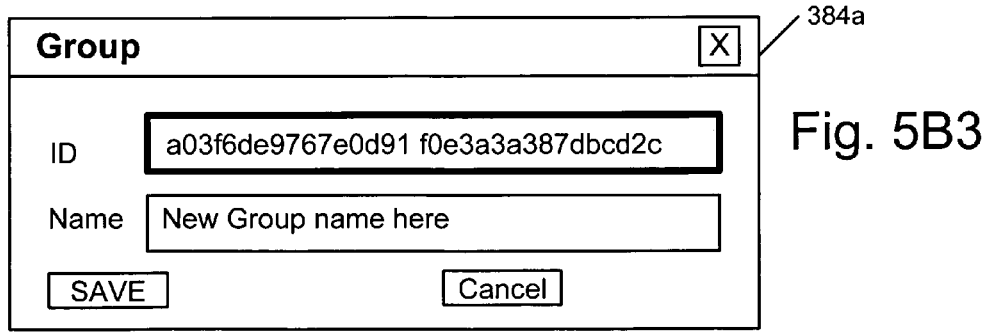
Fig. 5B3

GROUP INTERCOM, DELAYED PLAYBACK, AND AD-HOC BASED COMMUNICATIONS SYSTEM AND METHOD

PRIORITY CLAIM

This patent application claims priority under 35 USC 119(e) from U.S. Provisional Patent Application Ser. No. 60/509,282 filed on Oct. 6, 2003 and entitled "Group Intercom, Delayed Playback, and Ad-Hoc Based Communications System and Method", claims priority under 35 USC 120 and is a continuation in part of U.S. patent application Ser. No. 10/943,112, filed on Sep. 16, 2004 now U.S. Pat. No. 7,239,253 entitled "Codec System and Method" that claim priority under 35 USC 119(e) to U.S. Provisional Patent Application No. 60/504,169 filed on Sep. 18, 2003 and entitled "Codec System and Method" and claims priority under 35 USC 120 and is a continuation in part of U.S. patent application Ser. No. 10/943,107, filed on Sep. 16, 2004 entitled "Globally Unique Identification in Communications Protocols and Databases" that claims priority under 35 USC 119(e) to U.S. Provisional Patent Application No. 60/504,421, filed on Sep. 18, 2003 and entitled "Globally Unique Identification in Communications Protocols and Databases". All of the these priority documents cited above are incorporated herein by reference.

FIELD OF THE INVENTION

The invention relates generally to a wireless communications system and in particular to a wireless communications system in which a user plays sound and automatically chooses from disparate interactive sources based upon predetermined prioritization.

BACKGROUND OF THE INVENTION

A wireless communications network may have various known problems that limit the effectiveness of that communications network. These known problems are particularly concerning in an ad-hoc wireless network wherein a central fixed server may not be present. In a typical wireless communications network, it is desirable for push-to-talk communications to occur within arbitrary groups. However, in a typical wireless communications system, the push-to-talk communications occur on a specific radio channels. In the IP environment, multicasting does not react fast enough to changes in the network such as can be seen by roaming clients. The limited capability of underlying router infrastructure to adjust to changes is difficult to use correctly and involves long delays. Moreover, multicasting has limitations in the number of groups that can be targeted.

In a typical wireless communications system, two groups that are defined separately might be given the same identifier, i.e. the same name. Thus, later, when those two groups are reachable from each other, perhaps on the same subnet in the communications network, the identifiers can collide resulting in communication confusion. It is desirable to provide each group with a unique identification to prevent collisions. Furthermore, when a user wishes to listen to several groups, there may be some confusion that one group will be heavily used and of less importance than speech on a less used group and this makes it difficult for the user to listen to both groups effectively.

The typical wireless communications network also has security concerns. In particular, denial of service "attacks" can occur either accidentally or maliciously. For example, a device that malfunctions or is otherwise left in a transmitting state can deny service to listeners, which can occur even in a secure network. If the security of a network is breached, perhaps by someone taking control of a device belonging to someone legitimately within that network, then such denial of service can occur maliciously. Refusing to listen to a specific group denies all transmitters to the group the right to be heard, but there can be no alternative to a denial of service attack. It is desirable to provide a mechanism to obviate a denial of service attack.

In a typical wireless communications network, it is generally not possible for a listener to interrupt a push-to-talk speaker to request him to repeat what he has said. However, it is desirable to provide repetition as it is sometimes necessary for the listener to understand the speaker. A listener may alternately need to quickly change a push-to-talk session into a two-way conversation of some kind which is not possible with a typical wireless communications system. A standard phone call requires call announcement, usually a ring, which can be disruptive, unwanted, and time consuming relative to push-to-talk. With a typical wireless communications network, connectivity between sender and receiver may be interrupted arbitrarily due to various events, such as if on a wireless LAN a user may walk out of range, or on an Ad-hoc 802.11 network, two users might wander out of each other's range.

For push-to-talk, it is desirable for organizations with like structures to be configured similarly for push-to-talk communications. It is further desirable for configurations to be combined for some or all of the users of those configurations. Furthermore, encryption of the communications between groups may be desirable or required. In addition, the presence of members, whether they have spoken or not, on a subnet is not automatic. A user may have transmitted some time back, but no longer be present on the subnet. This may lead to an attempt to contact him unnecessarily.

Thus, it is desirable to provide an ad hoc wireless communications network that overcomes these problems with typical wireless communications systems and it is to this end that the present invention is directed.

SUMMARY OF THE INVENTION

An ad hoc network is provided. The ad hoc network includes groups that permit calling to occur within the groups. To achieve the ad hoc network, globally unique identifiers for the groups are used. Each group has a new random number of 16 bytes (128 bits) generated for it when it is created. When a group transmission is made, it is broadcast on the local subnet and control packets associated with the transmission contain the group identifier. They are sent out periodically interspersed with sound packets. In this way the destination group is quickly identified regardless of when a recipient begins to receive or re-receive the packets.

A configuration file is created for the user with the newly created identifiers and human readable names of the groups, and the configuration file is distributed to the machines of users in the group. The configuration files can be used as templates for similar organizations wherein the organizations might use the same human readable names, but have disparate identifiers. By generating new identifiers for any group this method guarantees that the identifiers will not collide, even if the two groups intermingle. Furthermore, the globally unique identifiers scales to any number of groups that might intermingle.

The configuration files contain priority information between groups, enabling a group transmission to be interrupted on a priority basis. For example, a group called "Platoon 1 leader" may have priority over group "Platoon 1." This priority allows someone listening on both groups to hear what is transmitted on the leader group preferentially. The user need not enter all relationships as transitive closure is computed; i.e. if group A is given priority over group B, and group B is given priority over group C, then group A implicitly has priority over group C and need not be entered by the user.

If a denial of service attack occurs, the wireless communications portable computing device user has the opportunity to refuse to listen to that source. The system permits the user to refuse to listen to a source for a limited time or permanently. This capability allows the user the ability to deny use of the communicator as a weapon to prevent communications between nearby users.

The users of the system in accordance with the invention are presented with the ability to replay recent sound on any group. This allows the user to replay transmissions without the necessity to request the sender to repeat himself. In the case that there are two groups on which he is listening, and there are simultaneous transmissions coming that he would normally listen to, he may replay sound for a group that was interrupted or which he did not hear.

Push-to-talk to a single person, as a group, is supported. When this is done, the receiver may turn the conversation into a standard two-way call. This, in effect, allows the caller to announce his call with his own voice, if he wishes, without causing a ring at the receiver. This can save considerable time as well as annoying sound.

A control packet containing the identifier of the destination group is sent out periodically, about once each half second, in the sequence of sound packets. This allows the entire information required to accept the call and prioritize it to be quickly received by a newcomer or a receiver with connectivity difficulties.

Two similar organizations may require similar configurations. To achieve this efficiently, a configuration file created for the first organization can be used to create a file for the second. Identifiers for groups, including all of the groups, may be regenerated without changing human readable names. This allows configurations to be used as templates for other groups. Some or all of the identifiers may be changed, to allow the users to keep certain groups common between them.

Configuration files may be combined or coalesced, this allows someone to exist in both configurations by way of the combined configuration file. This is also possible because of the random identifiers for the groups.

Encryption of communications is supported by creation of a secret 128 bit encryption key for each group. To listen to that group requires knowledge of the encryption key. The encryption key is never transmitted.

A client machine is elected as a proxy Location Server for all of the machines on the subnet that are running SymPhone. This proxy location server is determined by an election scheme that allows a client to propose itself as a server after a time failing to find a standard server. A standard server is a server that is not a client but specifically a server. If another client also proposes itself, or is found to also be a proxy on the same subnet, then the client with the highest client process identifier sends directed information to the other server. The other server, on receipt of that communication, becomes a client to the server with the higher id. Clients later attempting to report to the first server are directed to the second server. Client machines running SymPhone that are known to the location server are reported to other clients. Those clients that are currently on the system are reported to the user of each client machine as present users. An ad-hoc server will attempt to seek out other servers periodically by broadcast, since the subnet may be partitioned temporarily. If a client finds two or more Ad-hoc servers, it will use all of them as sources of information, but will report to the lower priority servers the presence of the higher priority server.

BRIEF DESCRIPTION OF THE DRAWINGS

FIGS. 5B1-3 illustrate examples of a group configuration file in accordance with the invention;

DETAILED DESCRIPTION OF A PREFERRED EMBODIMENT

The invention is particularly applicable to a wireless voice over IP communications system that uses portable computing devices, such as a PDA or a PocketPC and it is in this context that the invention will be described. It will be appreciated, however, that the system and method in accordance with the invention has greater utility since it may be used with wired communications systems and with other devices/software that implement a wired or wireless communications system.

Figure 1A:
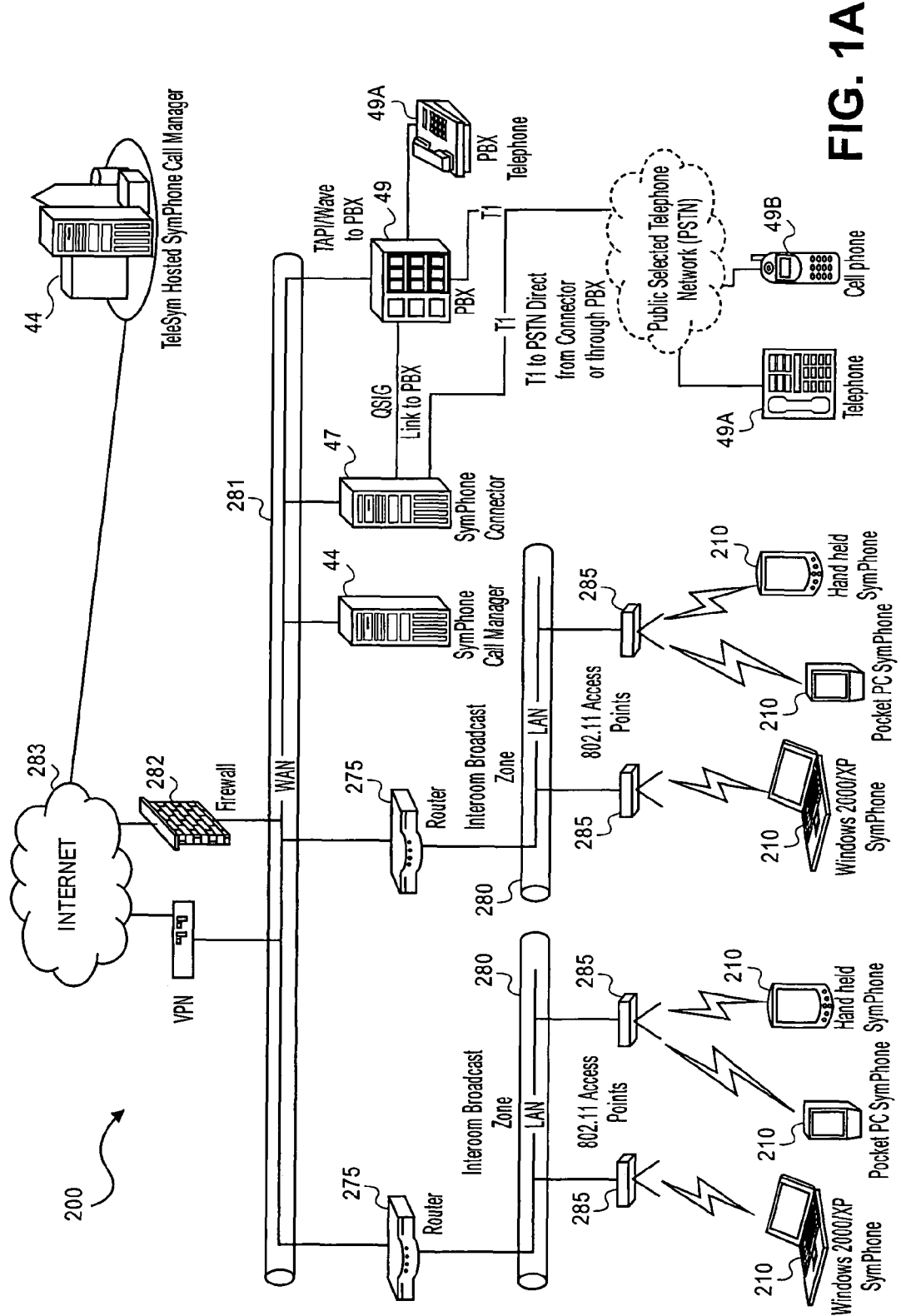
FIGS. 1A and 1B are block diagrams illustrating a wireless voice over IP communications system.
Figure 1B:
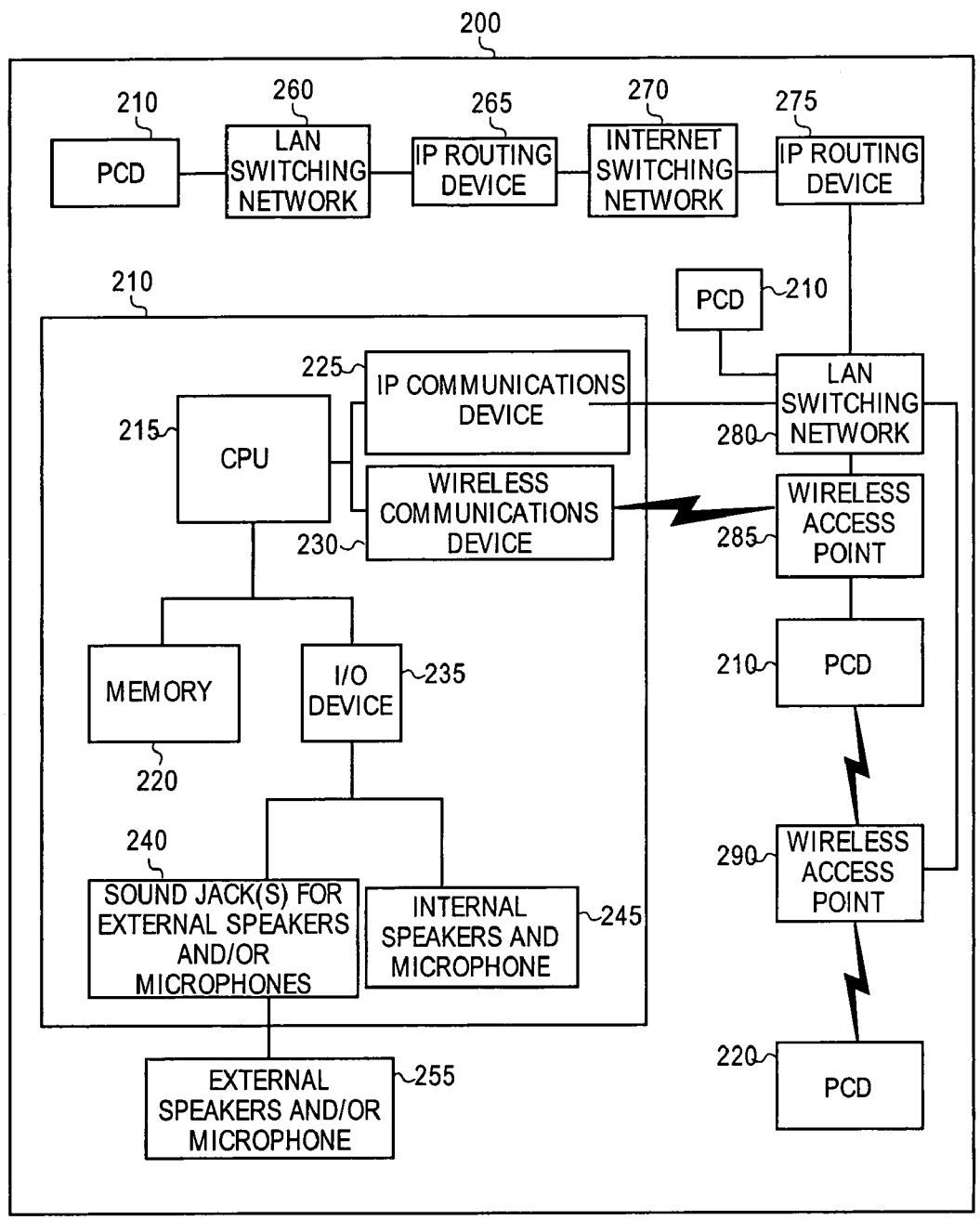

FIGS. 1A and 1B are block diagrams illustrating a wireless voice over IP communications system. In particular, FIG. 1A is a block diagram illustrating a communications system 200 in accordance with the invention that supports both wired, wireless and voice over IP (VoIP) telephony in accordance with the invention. As shown in FIG. 1A, the system may include one or more computer networks, such as one or more local area networks (LANs) 280 and a wide area network (WAN) 281 wherein each LAN 280 is connected to the WAN 281 via a well known router 275. Each LAN is connected to one or more wireless access points 285 which are in turn connected wirelessly to one or more personal communication devices (PCD) 210. In a preferred embodiment, 802.11 wireless access points are being used. In accordance with the invention, the PCD may comprise a laptop computer, a PocketPC device, a handheld device, a portable digital assistant and/or any other computing devices with sufficient processing power to execute one or more software applications that implement a VoIP phone on the PCD. The PCDs communicate with an access point 285 in order to provide VoIP telephony in which the PCD provides a user interface (such as the example shown in FIG. 2B) that permits the user to make a telephone call using the PCD. The voice of the user is converted into digital form and sent with digital data for the communications session including the digital voice data through the access point 285 and across the LAN 280 (to which the particular access point is connected) to a router 275 and then onto the WAN 281. The digital data for the phone call is then routed to the appropriate location, such as through a firewall 282 to a communications/computer network 283, such as the Internet 283, to a phone call manager 44 hosted by Telesym, or to a call manager 44 attached to the WAN 281 as shown. The call manager 44 may be one or more pieces of software being executed by a computer system, such as a desktop computer or server computer, that processes the VoIP telephone calls. As shown in FIG. 1, the system may further comprise a connector system 47 which links the VoIP system to a PBX 49 through the WAN 281. The connector system 47 may permit typical telephones 49a and cellular phones 49b to be connected to/from the PCDs 210. Thus, the system permits telephonic communications to occur between a PCD 210 user and another PCD user, between an outside telephone and a PCD user or between a PCD user and an outside telephone.

FIG. 1B depicts a general system architecture 200 for wired and wireless IP telephony. The environment consists of multiple personal communication devices (PCDs) 210 comprising various components that handle sound or video. Each PCD 210 includes a CPU 215 having memory 220 in communication with an IP communication means 225, nominally a LAN Media Access Card (MAC), a wireless communications device 230, which is nominally a IEEE 802.11, Bluetooth, IR or similar compliant standard. The communications device may include LAN, Internet, and other wireless devices.

The PCD 210 further includes an I/O port 235 for audio or video importing and exporting, audio jacks 240 and optionally internal speakers and/or microphone 245, which are all in communication and controlled by CPU 215. The PCD 210 may also include external speakers and a microphone 255. Interactive sound communication occurs in a path from the microphones of one PCD 210 to the speakers of another PCD 210, and vice-versa. Each component may contribute to latency. In addition to the physical components shown in FIG. 1A and FIG. 1B, there may be software components that may also contribute to latency, such as the sound codecs (coder and decoder) that is described in more detail in co-pending U.S. patent application Ser. No. 10/943,112 filed on Sep. 16, 2004 and entitled "Codec System and Method" which is incorporated herein by reference.

In a typical operation, the PCD 210 connects via a LAN switching network 260/280, such as an Ethernet switch or hub or similar type network device. The LAN 260/280 is normally connected to an IP routing device 265, such as a standard IP standalone router or a PC or similar device configured for routing. The IP routing device 265 is in communication with a communication switching network 270, such as the Internet or other communications network which is further in communication with an IP routing device 275, such as a typical router as described above. As depicted in FIG. 1B, the PCD 210 can be connected to a LAN 280 or wireless access point 285 and 290 either hardwired or via a RF/wireless connection. Now, the personal computing device 210 and its user interface will be described in more detail.

Figure 2A:
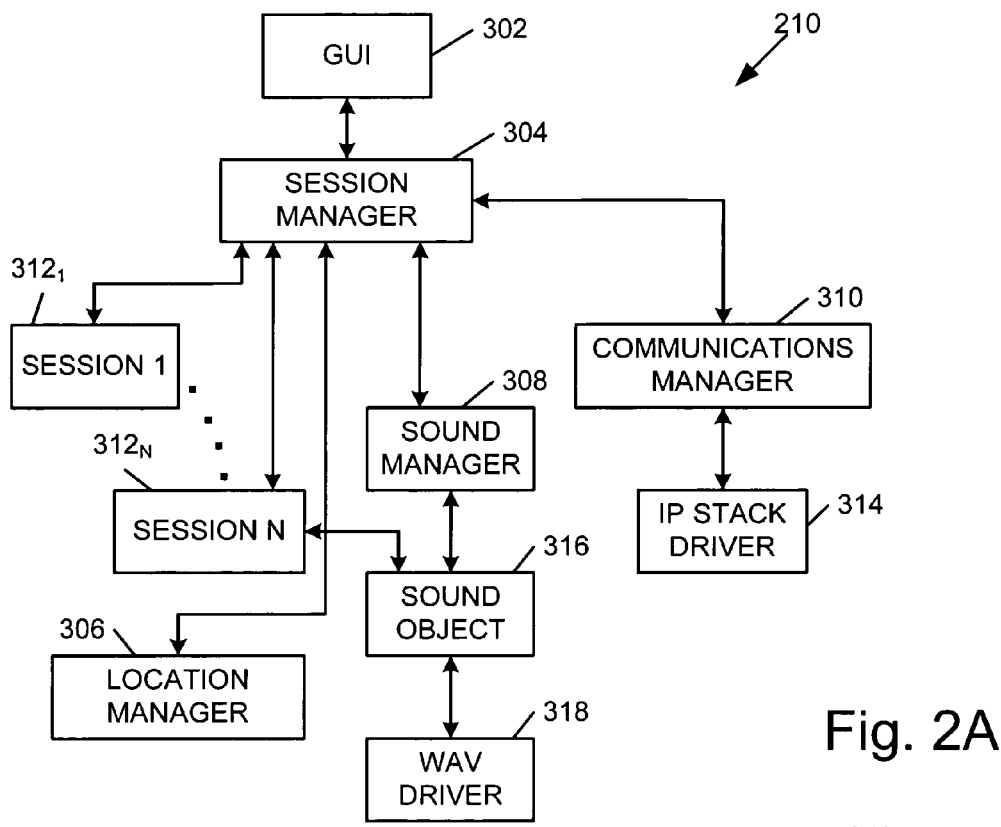
FIG. 2A is a block diagram of a personal communications device that communicates using the wireless voice over IP communications system shown in FIG. 1.

FIG. 2A is a block diagram of a personal communications device 210 that communicates using the wireless voice over IP communications system shown in FIG. 1. In FIG. 2A, the logical structure of the PCD is shown as opposed to the physical structure that is shown in FIG. 1B. The blocks shown in FIG. 2A may be collectively referred to as a symphone process that implements the communications system. Each of the elements shown in FIG. 2A may be implemented as one or more pieces of software code being executed by the PCD or each may be an embedded hardware device within the PCD. In a preferred embodiment, the modules described below may be implemented using object oriented software code and be represented as objects. As shown, the PCD may include a graphical user interface module 302 that control the user interface displayed to the user, such as that shown in FIG. 2B. The PCD may further include a session manager module 304, a location manager module 306, a sound manager module 308 and a communications manager module 310. The session manager module 304 controls the overall operation of the communications system and each communications session, such as Session1-SessionN $312_1$ to $312_n$, and controls the other modules of the system as shown. The communications manager module 310 may control the IP communications traffic and protocols, such as by sending commands/receiving data from an IP stack driver 314, of the PCD, communicate the data from the IP stack driver to the session manager and communicate data from the session manager to the IP stack driver. The location manager 306 may track the location of each PCD communicating with the particular PCD. The sound manager 308 controls and generates the voice/audio data of the PCD and may include, for example, a codec that compresses/decompresses the audio data. To this end, the sound manager 308 may generate a sound object 316 that is in turn passed to a wav driver 318 that generates the requisite sounds. When there is an active communications session, such as SessionN in FIG. 2A, SessionN may also control the generation of the sound object 316.

In accordance with the invention, each PCD may also include a library routine/computer program (not shown) that, upon a request, generates a globally unique random number identifier that is described in more detail in co-pending U.S. patent application Ser. No. 10/943,107 filed on Sep. 16, 2004 entitled "Globally Unique Identification In Communications Protocols And Databases" which is incorporated herein by reference. The random number generation process preferably generates a cryptographically strong random number. There are many known techniques for generating a cryptographically strong random number sequence, such as a cryptographically strong hash function. As is well known, one must start with a seed with random bits so that the same numbers are not generated by distinct computer-based random number generators. The seed with the random bits may be generated in various manners. For example, the computer may measure an analog process, such as the drive signal for a motor, so that a random signal is generated with a random probability. As another example, the computer system may measure a physical process, such as the number of photons from a light source over predetermined intervals, to generate the seed value. An another example, the computer may compare two clocks, such as the clock in the CPU and a real-time clock, and use differences between the two clocks to generate the random number seed. Thus, based on the random seed and a well known random number generator, a random number of a particular number of bits may be generated.

The random number is then used as the globally unique identification number in accordance with the invention. The length of the random number (which can vary in accordance with the invention) determines how likely/unlikely it is that two randomly generated numbers are identical. In accordance with the invention, since the communications system is spread over a plurality of entities that are independently establishing a new communications session and therefore generating a new communication session identification code, the random number must be sufficiently large so that the chances of an identical communications session identification are low. One advantage of the globally unique random number identification code is that each user of the communications system may independently generate its own globally unique identification code without any fear of overlapping/conflicting with other globally unique identification codes. In a preferred embodiment of the invention, a 128 bit random number is used. The chances of an identical globally unique identification code using 128 bits is very small. In particular, assuming 4 billion calls per day that are stored in a database for 100 years, the probability of a collision (two identical identification codes in the database) is less than 1 in 4 billion which is a very insignificant chance. If a user of a communications system would like to have a smaller chance of collision, then a larger sized random number, such as 1024 bits, may be used. Thus, a user may increase or decrease the chance of conflict (and increase or decrease his level of comfort and concern) by changing the number of bits in the globally unique random number identification code. The changing of the bits in the globally unique random number identification code does not affect the communications protocols so that the level of security of the communications protocols may be easily changed/modified.

The globally unique random number identification code has another advantage over typical identification schemes. In particular, the globally unique random number identification code makes it impossible to extract any information about the parties to the communications session so that, as described above, the globally unique random number identification code may be sent unencrypted. Further, it is impossible to even determine that the globally unique random number identification code, except by its position in packets, is in fact an identification code.

Figure 2B:
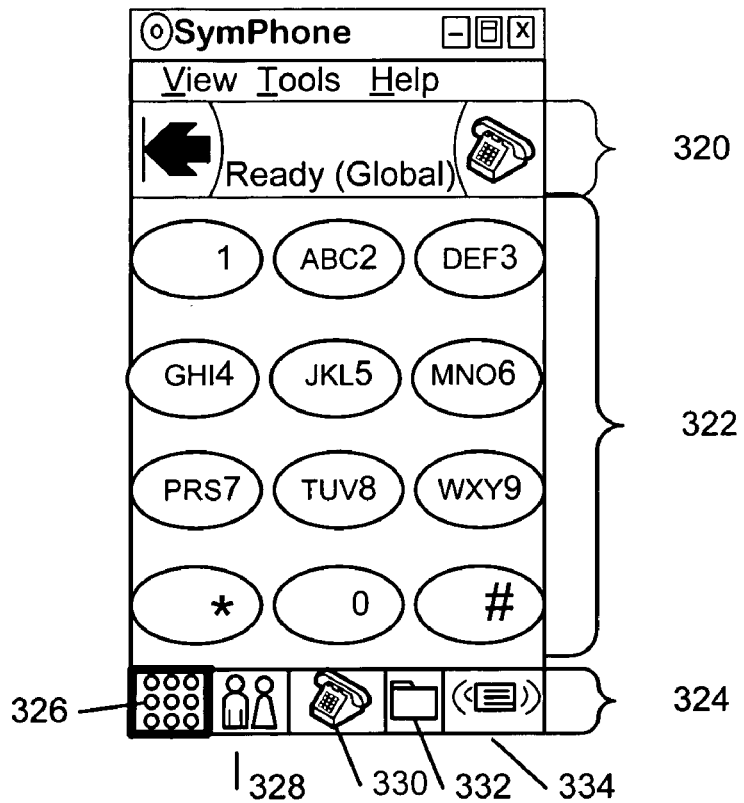
FIG. 2B is a diagram illustrating an example of the user interface associated with the personal communications device of FIG. 2A.

FIG. 2B is a diagram illustrating an example of the user interface associated with the personal communications device 210 of FIG. 2A. The user interface of the device may include a display portion 320, an interface portion 322 (that currently displays a dial pad) and a tasks bar portion 324. The display portion 320 displays the status of the device and any active/current calls. The user interface portion 322 permits the user to interact with the symphone process and the PCD, such as by entering a telephone number or DTMF generated tones into the device when the dial pad is displayed and the tasks bar portion 324 may include a dial pad tab 326 (the dial pad tab is selected in FIG. 2B and the dial pad user interface is shown in FIG. 2B), a contacts tab 328 that provides a user interface to access a contacts program, a call tab 330 to access call information, a file tab 332 to store and retrieve files/messages and an intercom tab 334 that permits the user to initiate a call with a group of people as described below in more detail. Now, an ad hoc wireless network in accordance with the invention will be described in more detail.

Figure 3:
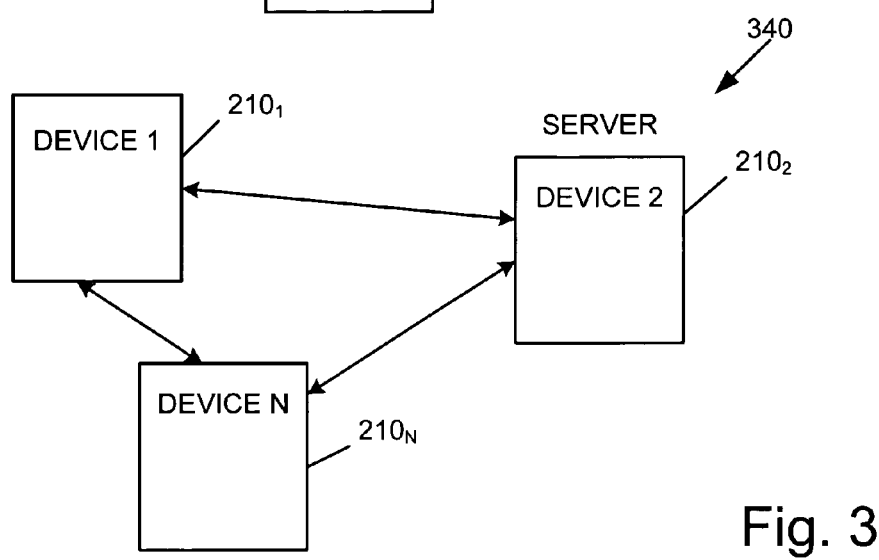
FIG. 3 is a diagram illustrating an ad hoc wireless network in accordance with the invention.

FIG. 3 is a diagram illustrating an ad hoc wireless network 340 in accordance with the invention that is composed of a plurality of personal communications devices 210. In particular, one or more personal communications devices, such as device1, device2, . . . deviceN ($210_1$, $210_2$, . . . , $210_N$) may establish the ad hoc communications network in accordance with the invention. In the typical communications network shown in FIG. 1A, the server 44 controls the operation of the system. In the ad hoc network 340, one of the PCDs 210 acts as the server. In accordance with the invention, the exact identity of the server in the ad hoc network at any time changes so that, at any time, any of the PCDs may become/continue to be the server. For example, in a military setting, a plurality of soldiers out in the field may each have a PCD to communicate with each other. In this military setting, there is not a server available so that the PCD of one of the soldiers will become the server and act as the server so that the soldiers are able to communicate with each other. The method for determining the server in the ad hoc network is described below. In the event that the particular soldier moves out of range of the other soldiers, another PCD becomes the server. The server may perform various functions such as maintaining the location information of the PCDs in the ad hoc network and respond to queries from other PCDs about the location of a particular PCD in the ad hoc network. Now, a method for determining the server in the ad hoc network when more than one portable communications device is capable of being the server will be described.

Figure 4:
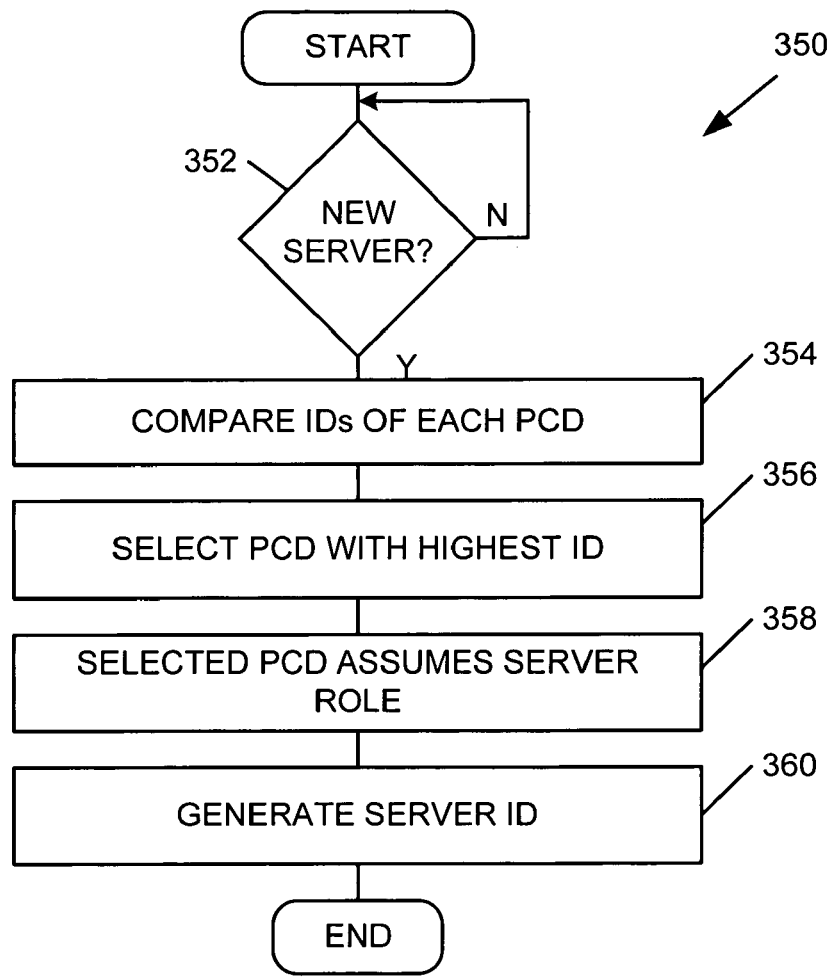
FIG. 4 is a diagram illustrating a server determination method for the ad hoc wireless network shown in FIG. 3.

FIG. 4 is a diagram illustrating a server determination method 350 for the ad hoc wireless network shown in FIG. 3. The method may be performed at any time during the existence of the ad hoc network when it is necessary to determine/select/elect a new server. To understand this method, it is necessary to understand that each PCD 210 in the ad hoc network has a globally unique random number identification code. Each PCD has its own globally unique random number identification code that permits any PCD to be distinguished from any other PCD. Furthermore, each communications session is assigned a globally unique identifier. The server determining method 350 may be executed by any PCD that is part of the ad hoc network, but may be preferably executed by an assigned leader of the ad hoc network, such as the platoon leader of a military platoon of soldiers. In step 352, the method determines if a new server is needed. For example, a new server may be required if the prior PCD assigned to be the server has left the range of the ad hoc network, if the PCD that was previously the server was lost/fell into enemy hands, or if the ad hoc network occasionally reassigns the server responsibilities periodically for security reasons. If a new server is required, then, in step 354, the globally unique identifier, of each PCD in the ad hoc network who is currently able to be the server (for example, PCDs who are out of the network range or are known to be compromised will not be included in this process), is compared. In step 356, the PCD with the globally unique identifier which has the greatest value is selected. Alternatively, in accordance with the invention, each time that a new server is being selected, each PCD involved in the process may generate a new globally unique identifier which is then compared so that the same PCD with the largest current globally unique identification is not always selected as the server. In step 358, the PCD with a largest globally unique identifier assumes the role of server and generates a new globally unique identification in step 360 that serves as a server globally unique identifier. If each PCD already generated a new globally unique identification at the beginning of the process as described above, then step 360 is not required. In accordance with the invention, when the particular PCD is no longer the server (for whatever reason), it may discard its globally unique server identification. In accordance with the invention, the role of the server is to act as the controller of the ad hoc network. The server may store the identifier of each PCD assigned to the ad hoc network, of each PCD currently within range of the ad hoc network and any PCD which has been compromised and is being excluded from the ad hoc network. In accordance with the invention, the server may become the location manager (See FIG. 2A) for the ad hoc network.

In accordance with the invention, for the ad hoc network, it is desirable to establish a group of PCDs that are able to communicate with each other. The group also permits a broadcast message, such as an intercom or push to talk communication, to occur between members of the group. For example, each platoon in a military unit may be assigned its own group identification so that the leader of that platoon can communicate, via push to talk, with the members of his group. In accordance with the invention, the ad hoc network may have hierarchically arranged groups in that a particular group may be a group of other groups. For example, a military commander might have a group that includes all of the platoons assigned to his command. In accordance with the invention, the precedence of each group may be determined. For example, a broadcast message from the commander will take precedence over a message from the leader of a platoon.

Figure 5A:
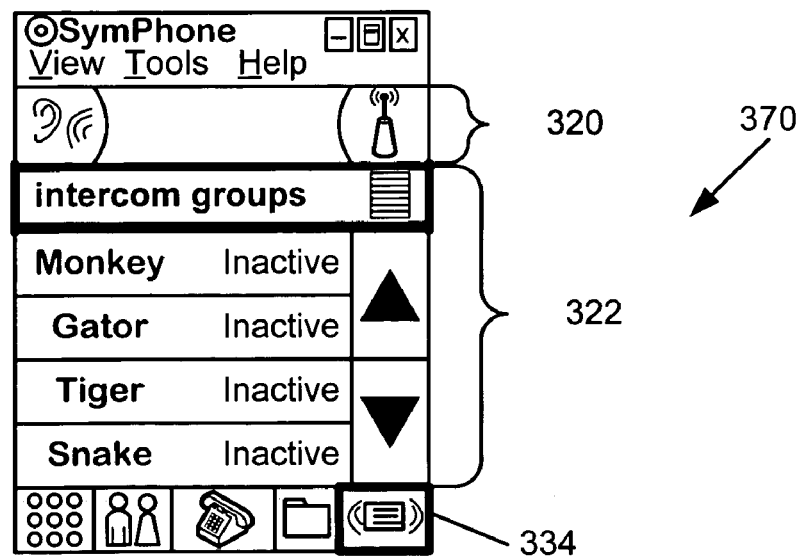
FIG. 5A is a diagram illustrating an example of a user interface for a group on the portable computing device.

FIG. 5A is a diagram illustrating an example of a user interface 370 for a group on the PCD. As shown, the user interface portion 322 displays a group list since the intercom tab 334 has been selected. The user interface permits the user to scroll through one or more groups and select a group. In accordance with the invention, each group name is human readable. Each group is established using a group manager utility/computer program that may be resident on each PCD in the ad hoc network or on certain PCDs on the ad hoc network. FIG. 5B1-3 illustrate examples of a group configuration file generated by the group manager utility in accordance with the invention. FIG. 5B1 illustrates a group manager 380a user interface, FIG. 5B2 illustrates a relation manager 382a user interface and FIG. 5B3 illustrates a user interface 384a for establishing a new globally unique identification code for a new group. In accordance with the invention, a configuration file is created for the user with the newly created identifiers and human readable names of the groups, and the configuration file is distributed to the PCDs of users in the group. The configuration files can be used as templates for similar organizations wherein the organizations might use the same human readable names, but have disparate identifiers. By generating new globally unique identifiers for any group, this method guarantees that the identifiers will not collide, even if the two groups intermingle. Since the globally unique identifiers are unique, any number of groups may be intermingled. The configuration files contain priority information between groups, enabling a group transmission to be interrupted on a priority basis. For example, a group called "Platoon 1 leader" may have priority over group "Platoon 1." This priority allows someone listening on both groups to hear what is transmitted on the leader group preferentially. The user need not enter all relationships (priorities) as transitive closure is computed; i.e. if group A is given priority over group B, and group B is given priority over group C, then group A implicitly has priority over group C and need not be entered by the user.

As shown in FIG. 5B1, various groups are shown wherein, using a groups portion 386a, the user may create a new group, modify an existing group or delete a group and, using a relationship portion 388a, the user may add or delete a relationship (priority relationships) between the groups as shown in more detail in FIG. 5B2. When a new group is created, a new globally unique identifier is assigned to the group as shown in FIG. 5B3 using the globally unique library as described above. In accordance with the invention, since each group has a globally unique identification code, any group may be temporarily combined with any other group to temporarily form a larger ad hoc network. For example, when a first platoon and second platoon (with different groups) are going to be working with each other for a particular mission, the groups may be combined together into a single larger group so that broadcast messages may be communicated to the entire group. When the groups separate, the two groups return to their original state with each group forming a smaller ad hoc network.

As shown in FIG. 5B1, the group "monkey" has precedence over group "gator" and group "snake" has precedence over group "swordfish". In accordance with the invention, the precedence affects whose broadcast message will be heard when two broadcast messages of different priorities are being broadcast. The precedence will also determine when a broadcast message from a particular group may override all other communications within a particular group. For example, assuming that the "gator" group is a particular platoon while "monkey" is the commanding officer of that platoon and many other platoons, when the "monkey" group broadcasts a message, that message will stop any other communications in the "gator" group including broadcast messages within the "gator" group and every platoon will hear the broadcast message. In accordance with the invention, each group may include one or more members so that a group may be a single PCD, such as the commander of a military operation, a group may be a group of PCDs, such as a platoon of soldiers, or a group may be one or more groups, such as the platoon groups underneath a particular leader. In this manner, the users of the ad hoc network may be divided and sub-divided in any manner and a priority scheme for messaging within the ad hoc network may be easily implemented. In accordance with the invention, the particular configuration of a particular group may be used as a template for other PCDs and may be, for example, distributed to other PCDs.

Figure 6:
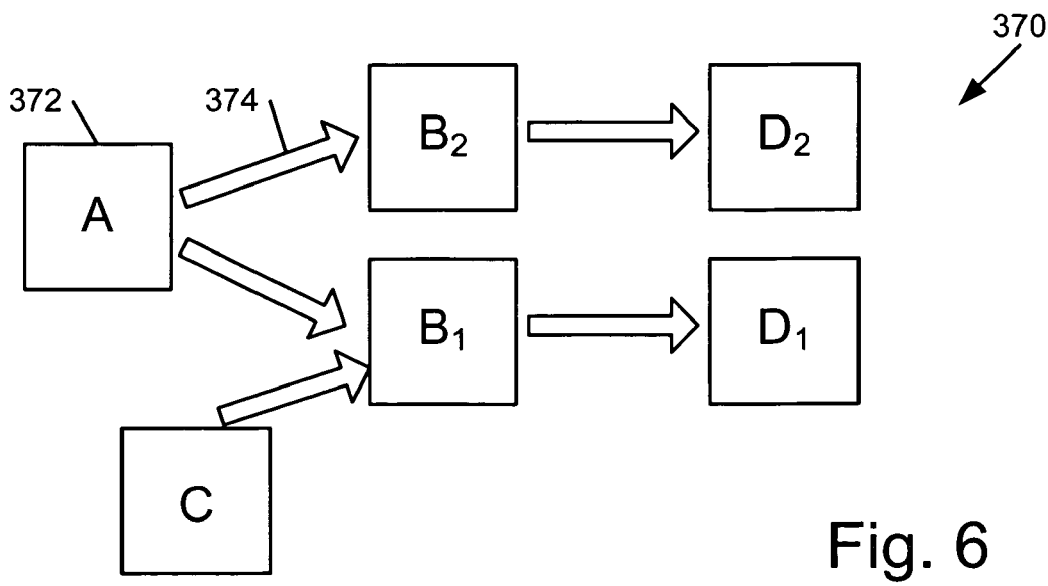
FIG. 6 illustrates an example of group precedence in accordance with the invention.
Figure 7:
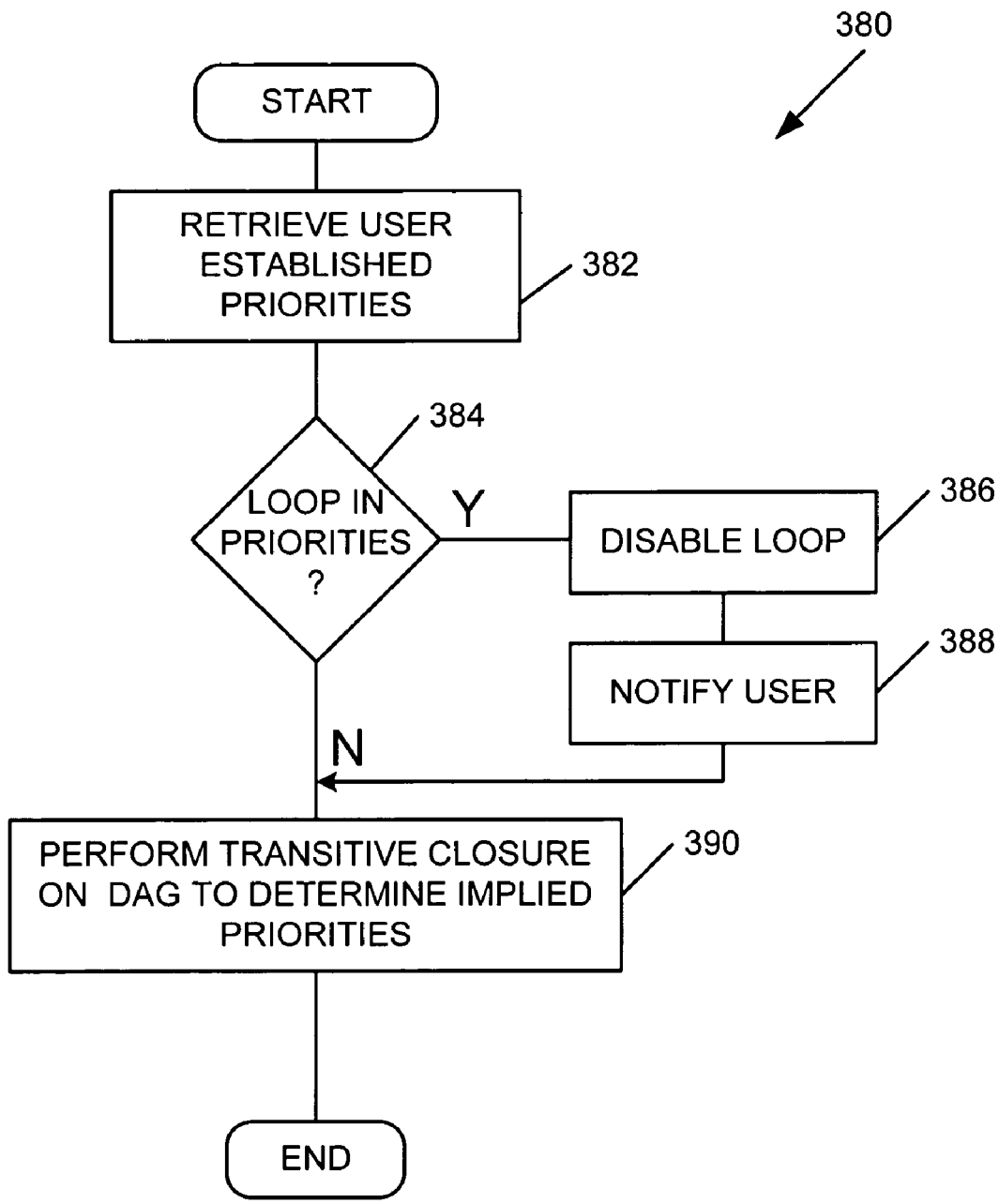
FIG. 7 is a flowchart illustrating a method, in accordance with the invention, for determining precedence for groups in accordance with the invention.
Figure 8A:
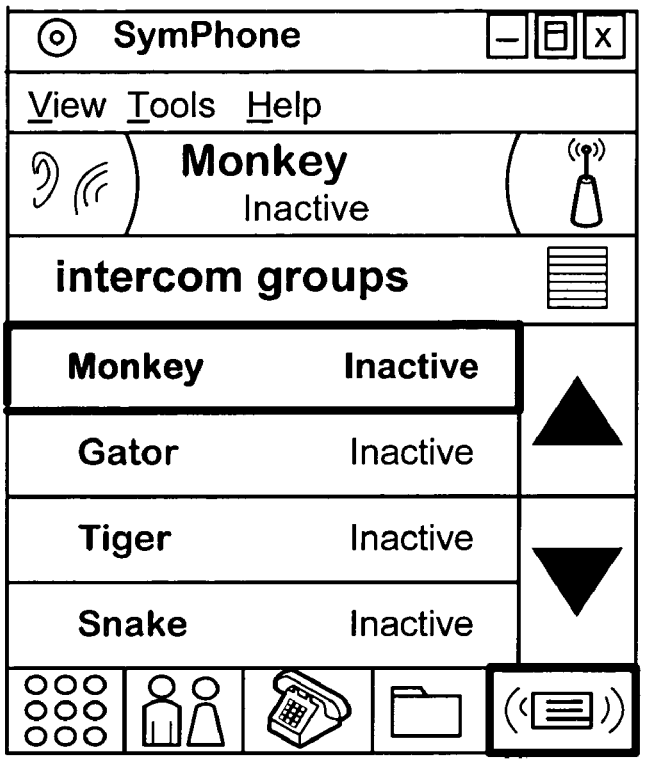
FIGS. 8A-8B are examples of a group intercom user interface in accordance with the invention.
Figure 8B:
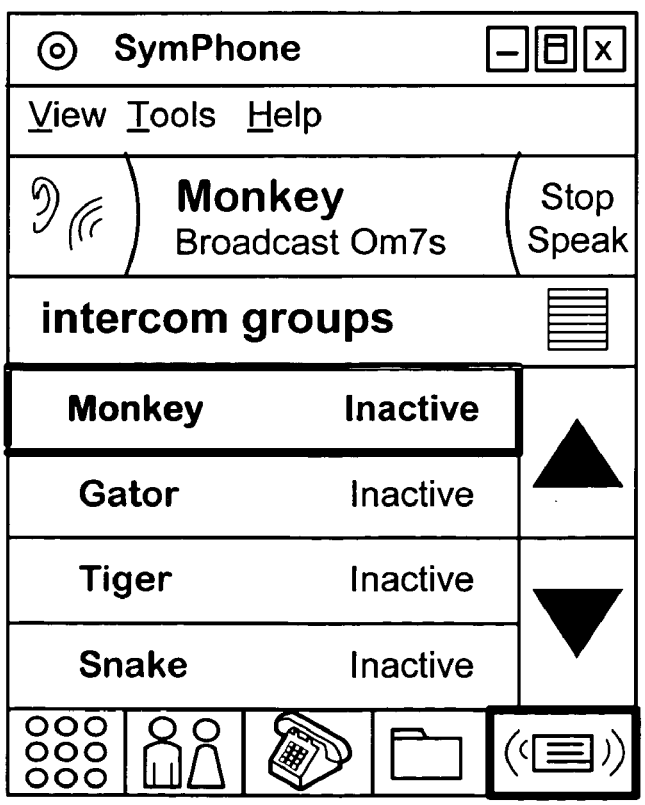

FIG. 6 illustrates an example of group precedence in accordance with the invention wherein the precedence is shown as a directed acyclic graph (DAG) 370. Each group 372 is shown wherein a precedence 372 is shown as an arrow so that, for example, group A has precedence over group B1. In the example shown in FIG. 6, group A has precedence over group B1 that is turn has precedence over group D1. FIG. 7 is a flowchart illustrating a method 380, in accordance with the invention, for determining precedence for groups in accordance with the invention. In the example shown in FIG. 6, the precedence that are shown in the diagram have been created by the user using the group configuration tool described above. Thus, in step 382, the method retrieves the user established priorities/precedence. This method may be implemented on a particular PCD or on a computer system being used to establish and manage the ad hoc wireless network. In step 384, the method determines if there are any loops in the user defined precedences/priorities. For example, the user might inadvertently assign priorities such that no group has the highest priority in the ad hoc network and it is never possible to determine the priority for a broadcast message. If a loop is detected, then the loop is disabled in step 386 and the user is notified in step 388. The loop may be only disabled since, if the precedences for a particular ad hoc network may change/be modified, the disabled priority may be reactivated if a changed priority scheme has eliminated the loop in the priority scheme. In step 390, the method may perform a well known transitive closure procedure on the priority scheme (represented as the DAG) in order to determine any implied priorities. For example, in the DAG shown in FIG. 6, there is an implied priority in that group A has precedence over group D2 and D1 and group C has precedence over group D1. Thus, these implied precedence relationships are identified and stored in the system so that a complete priority scheme is established for the ad hoc network. These priority schemes permits the ad hoc network to provide push to talk functionality since the ad hoc network may determine, from the priority scheme, the broadcast message (from a particular group) that has precedence over other broadcast messages or other communications. FIGS. 8A-8B are examples of a group intercom user interface in accordance with the invention. As shown, each group name is shown with its current status for the particular PCD. For example, in FIG. 8A, the groups are all inactive. In FIG. 8B, an intercom/broadcast/push to talk communications session with the "monkey" group is active. Now, a call announcement method in accordance with the invention will be described.

Figure 9:
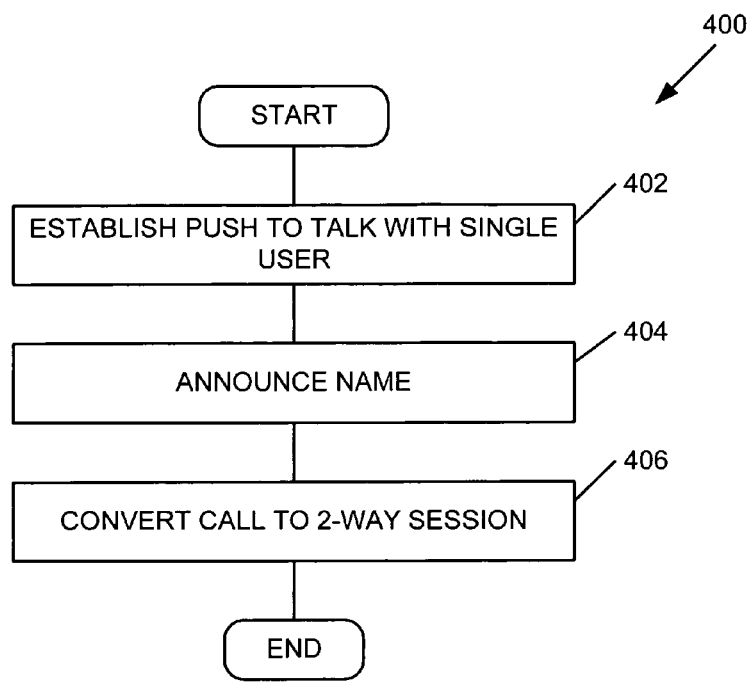
FIG. 9 is a flowchart illustrating a method for call announcement without a ring.

FIG. 9 is a flowchart illustrating a method 400 for call announcement without a ring. In step 402, a user may establish a push to talk/intercom/broadcast communications session with another user (who may be, for example, the only member of a group) and announce his/her name in step 404. In step 406, the user may convert that push-to-talk communications session into a two-way communications session to proceed with the conversation with the other party. In this manner, the call may be announced with a name and then the conversation in converted into a typical communications session.

The ad hoc network in accordance with the invention desirable needs to have some security systems and methods. In particular, since there is no central server in the ad hoc network to perform security screening of user, etc. . . it is necessary that each PCD in the ad hoc network (since each PCD may be the assigned server) have some security features. For example, in a military application, the user of a particular PCD may be captured or killed and therefore his PCD may be lost or fall into enemy hands. It is desirable to disable that lost device and prevent that lost device from disabling the entire ad hoc network. In particular, an enemy may continuously transmit to the ad hoc network (a type of denial of service attack) so that no none else connected to the ad hoc network is able to communicate. In another example, a user might inadvertently leave his PCD on and transmitting and it is desirable to be able to ignore that transmission so that the ad hoc network is not crippled by that user. For example, if a denial of service attack occurs, the user of a PCD executing the SymPhone process has the opportunity to refuse to listen to that source. He may refuse for a limited time or permanently. This capability allows the user the ability to deny use of the communicator as a weapon to prevent communications between nearby users. Therefore, a security system in accordance with the invention that is part of the ad hoc network in accordance with the invention will be described.

Figure 10:
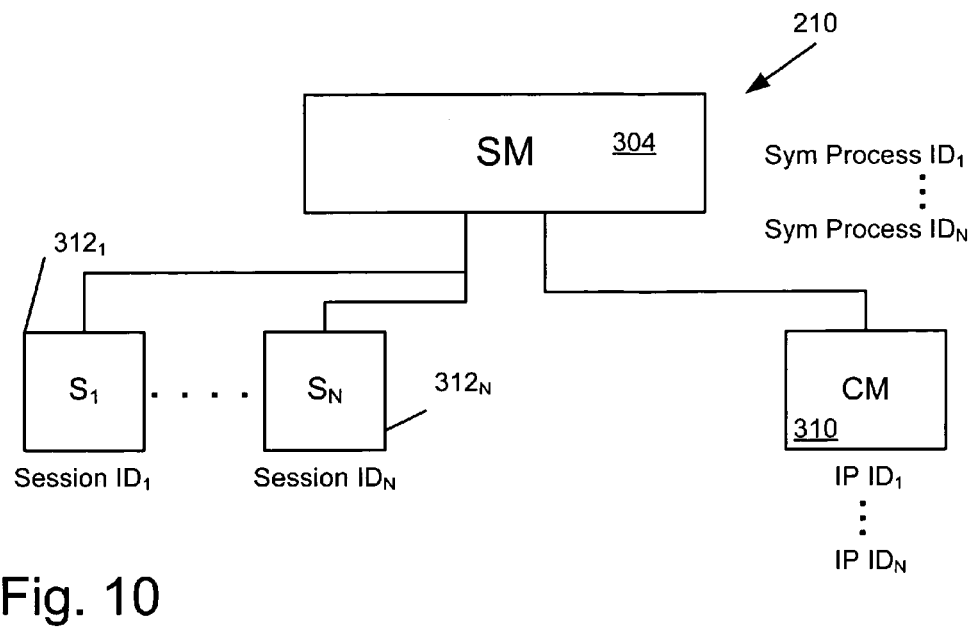
FIG. 10 is a block diagram illustrating the security against a denial of service attack in accordance with the invention.

FIG. 10 is a block diagram illustrating the security against a denial of service attack in accordance with the invention. The block diagram of a few elements of a PCD 210 are shown including the session manager module 304 and the communications manager 310 along with one or more communications sessions $312_1$-$312_N$. In accordance with the invention, each communications session, each symphone process and each PCD has its own globally unique identifiers, such as Session $ID_1$-Session $ID_N$, SYMPROCESS $ID_1$-SYMPROCESS $ID_N$, and IP $ID_1$-IP $ID_N$, so that each communications session, symphone process and PCD in the ad hoc network is always uniquely identified. The communications session ID uniquely identifies each communications session within the ad hoc network and the symphone process ID uniquely identifies each symphone process on a PCD (since a PCD, such as a server or workstation, might have more than one symphone process at any one time) at a particular time. Each time a symphone process is closed on the PCD and then restarted, a new symphone process ID is generated so that the symphone process for a particular PCD will change. The IP ID uniquely identifies a particular PCD by its assigned IP address. Optionally, the ad hoc network may also assign a fixed identification code to the physical PCD which would uniquely identify the PCD even if one attempted to change the IP address assigned to the PCD. Thus, as shown, a problem with a particular communications session may be identified at the communications session level, at the symphone process level and/or at the PCD device level. That problem may include, for example, a denial of service attack by an enemy, an inadvertently active communications session or any other situation where a particular communications session might be considered to be causing a problem within the ad hoc network. The problem may be identified in various manners, such as, for example, if a particular communications session is active for longer than a particular amount of time, but there is no sound data being communicated or if the sound data being communicated in just noise. Since a problem can be identified at various different levels, a problem escalation method may be implemented.

Figure 11:
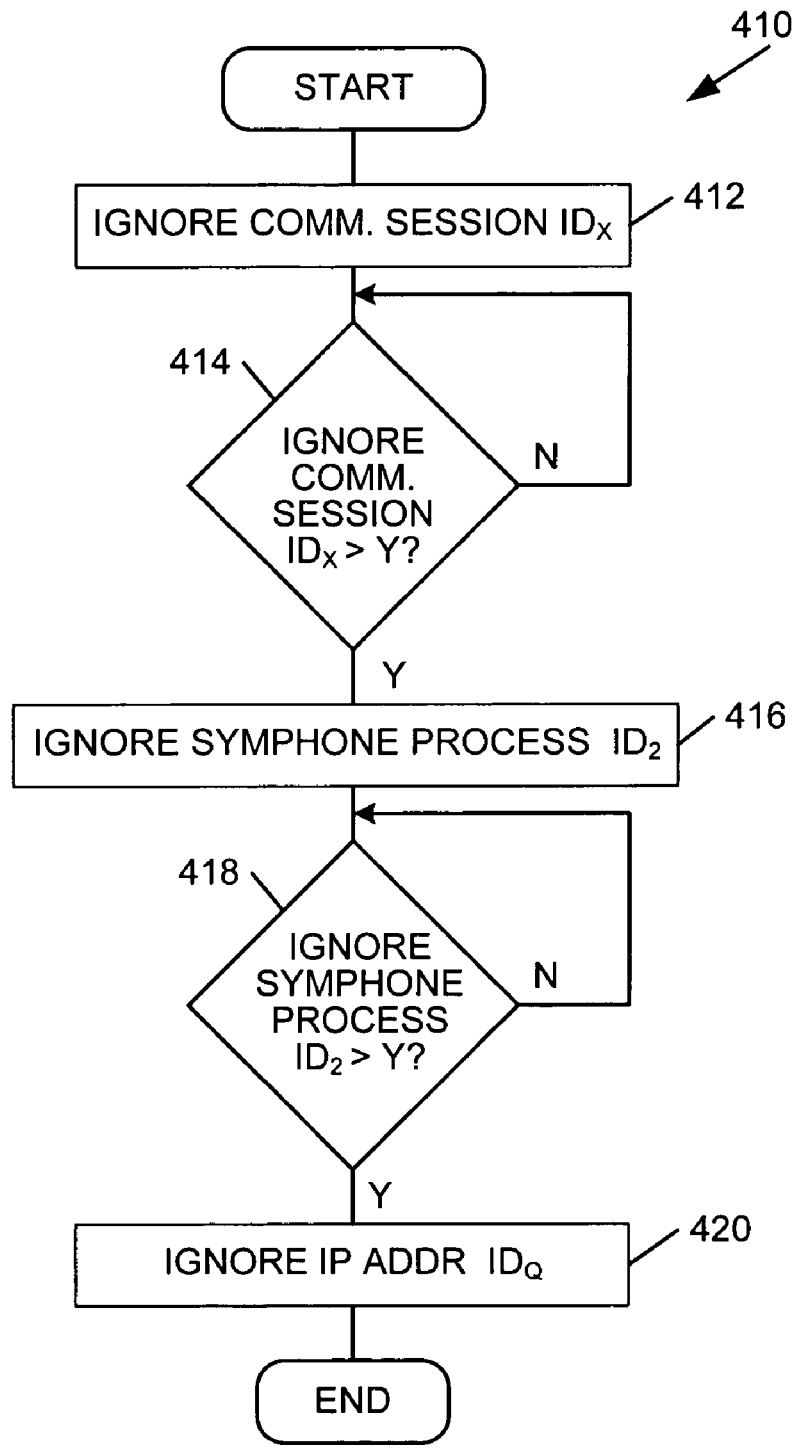
FIG. 11 is a flowchart illustrating a problem escalation method in accordance with the invention.

FIG. 11 is a flowchart illustrating a problem escalation method 410 in accordance with the invention. In step 412, a communications session has been identified that has a problem and the PCD executing this problem escalation method has ignored that communications session. The communications session may be ignored for some predetermined time and then reactivated. In accordance with the invention, each PCD that is part of the ad hoc network may implement this problem escalation method so that each PCD ensures its own security. The combined information about any problem communications sessions, etc . . . may be shared by the PCDs of the ad hoc network and used to exclude a user/PCD from the ad hoc network as described below with reference to FIG. 12. In step 414, the method may determine if that communications sessions has been ignored for some predetermined period of time greater than some threshold, such as 2 minutes or it has been ignored and reinstated more than a predetermined number of times, such as 3. If not, the method loops back to step 414. If the communications session has exceeded the threshold set in step 414, then the PCD may ignore the symphone process ID associated with that communications session in step 416. The symphone process ID may then be reinstated after some predetermined time. In step 418, the method may determine if that symphone process ID has been ignored for some predetermined period of time greater than some threshold, such as 2 minutes or it has been ignored and reinstated more than a predetermined number of times, such as 3. If not, the method loops back to step 418. If the symphone process ID has exceeded the thresholds set in step 418, then the IP address ID associated with the symphone process ID is ignored in step 420. In this manner, the problem is escalated from ignoring the particular communications session of a particular PCD to ignoring the particular symphone process (ignoring all of the communications sessions from a particular symphone process on a particular PCD) to ignoring the particular IP address of the PCD (ignoring all of the communication sessions from the PCD regardless of the symphone process). The method may also further ignore the physical PCD ID (ignoring all communications sessions from a particular PCD even if the IP address of the PCD changes) as a further escalation step.

Figure 12:
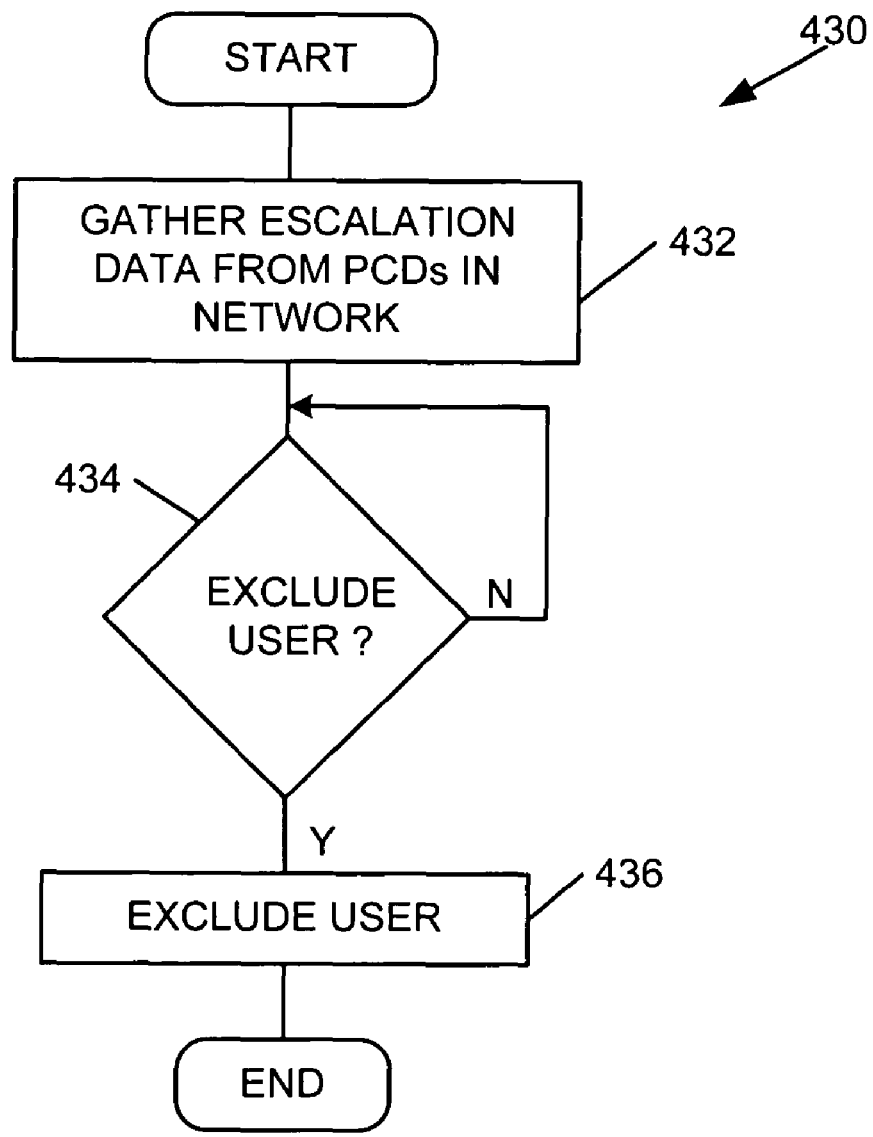
FIG. 12 is a flowchart illustrating an example of an exclusion of a user in accordance with the invention.

FIG. 12 is a flowchart illustrating an example of an exclusion method 430 of a user in accordance with the invention. In step 432, a PCD, such as the acting server, may gather the problem information, such as the problem communications sessions, problem symphone processes, the problem IP addresses and the problem physical PCDs, from each PCD in the ad hoc network. In step 434, the PCD may determine if it excludes a particular user from the ad hoc network, such as removing that user from all group lists, etc . . . For example, if each PCD of the ad hoc network has ignored a particular PCD ID, then it is likely that the particular PCD has been lost or fallen into enemy hands and should be excluded from further participation in the ad hoc network. Thus, in step 436, the user is excluded from the ad hoc network. In this manner, the problems caused by a particular communications session may lead to the exclusion of a particular PCD which will ensure that the ad hoc network is not disabled by a single problem communications session. The system, using the escalation and exclusion method, is able to identify a PCD that is being used improperly/nefariously and then exclude that PCD from the ad hoc network. In accordance with the invention, once a particular user/PCD has been excluded from the ad hoc network, the PCD acting as the server may generate a new encryption key to the remaining PCDs in the group and then communicate with that new encryption key which excludes that excluded PCD from intercepting further communications.

In addition to the exclusion of a user/PCD when a problem with that PCD has been identified, the system may also permit a user of the ad hoc system to exclude a particular PCD. For example, a particular user of the system might see that a soldier has been captured/left at the battlefield and may therefore disable the PCD of that user. As another example, a user may contact another user with a particular PCD (and receive no response one or more times) and decide to exclude that PCD from future communications since it is presumed that that PCD should no longer be a part of the ad hoc system. Thus, even when no problem of the PCD has been detected as described above, the system will permit a user of the system (with appropriate permissions) to exclude another user/PCD from the system based on that user's experience/knowledge.

The ad hoc network also permits a particular user (and a particular PCD) to store the sound data for a particular communications session(s) in the memory of the PCD and playback that communications session again or at a later date. In accordance with the invention, the user may select to store and then replay a communications session from a particular PCD or user or from a particular group. In particular, users are presented with the ability to replay recent sound on any group. This allows the user to replay transmissions without the necessity to request the sender to repeat himself. In the case that there are two groups on which he is listening, and there are simultaneous transmissions coming that he would normally listen to, he may replay sound for a group that was interrupted or which he did not hear.

The ad hoc network system may further include an emergency channel/group that may be implemented by an emergency group that has precedence over all other groups in the ad hoc network so that, when anyone transmits over that emergency group, all PCDs in the ad hoc network will listen to the transmission. The emergency channel/group may exist within each group configuration/group template so that every newly generated group has the emergency broadcast group/channel built into the group. Alternatively, each group of a particular type, such as a platoon group, may have the same emergency group ID so that when those groups are combined, the combined group will have a shared emergency channel.

In accordance with the invention, each PCD in the ad hoc network may include an ability to display the current locations of the other users of the ad hoc network. In accordance with the invention, each PCD may display 1) a list of the PCDs that recently communicated with other PCDs in the ad hoc network with PCDs within the range of the ad hoc network being identified; 2) a list of PCDs within range of the ad hoc network; and/or 3) a list of both PCDs that recently communicated and PCDs within the range of the ad hoc network wherein this list may be larger than the first two lists. Thus, the system will provide these various listings of the PCDs associated with the particular ad hoc network.

In summary, to achieve the above methods, the wireless communications network uses globally unique identifiers for the groups. Thus, each group has a new random number of some predetermine length, such as 16 bytes (128 bits) in a preferred embodiment, generated for it when it is created. When a group transmission is made, it is broadcast on the local subnet, control packets associated with the transmission contain the group identifier. They are sent out periodically interspersed with sound packets. In this way the destination group is quickly identified regardless of when a recipient begins to receive or re-receive the packets. A control packet containing the identifier of the destination group is sent out periodically, about once each half second, in the sequence of sound packets. This allows the entire information required to accept the call and prioritize it to be quickly received by a newcomer or a receiver with connectivity difficulties.

Furthermore, two similar organizations may require similar configurations. To achieve this efficiently, a configuration file created for the first organization can be used to create a file for the second. Identifiers for groups, including all of the groups, may be regenerated without changing human readable names. This allows configurations to be used as templates for other groups. Some or all of the identifiers may be changed, to allow the users to keep certain groups common between them.

As described above, a client machine is elected as a proxy Location Server for all of the machines on the subnet that are running SymPhone. This proxy location server is determined by an election scheme that allows a client to propose itself as a server after a time failing to find a standard server. A standard server is a server that is not a client but specifically a server. If another client also proposes itself, or is found to also be a proxy on the same subnet, then the client with the highest client process identifier sends directed information to the other server. The other server, on receipt of that communication, becomes a client to the server with the higher id. Clients later attempting to report to the first server are directed to the second server. Client machines running SymPhone that are known to the location server are reported to other clients. Those clients that are currently on the system are reported to the user of each client machine as present users. An ad-hoc server will attempt to seek out other servers periodically by broadcast, since the subnet may be partitioned temporarily. If a client finds two or more Ad-hoc servers, it will use all of them as sources of information, but will report to the lower priority servers the presence of the higher priority server.

While the foregoing has been with reference to a particular embodiment of the invention, it will be appreciated by those skilled in the art that changes in this embodiment may be made without departing from the principles and spirit of the invention and defined in the attached claims.

The invention claimed is:

1. An ad hoc wireless communications system, comprising:
 one or more personal communications devices that form an ad hoc wireless communications network;
 each personal communications device further comprising:
  a processor;

a plurality of modules, each module having a plurality of computer instructions executed by the processor to implement the ad hoc wireless communications network, wherein the plurality of modules further comprise
 a graphical user interface module that generate a user interface and
 a library that generates a globally unique identifier for the personal communications device
 a session manager that controls the overall functions of the personal communications device and a security module to respond to a denial of service attack from another personal communications device,
 a location manager, controlled by the session manager, that tracks the location of each other personal communications device that communicates with the personal communications device,
 a sound manager, controlled by the session manager, that generates the audio/sound data associated with the personal communications device and includes a sound codec, and
 a communications manager, controlled by the session manager, that controls the IP traffic and protocols; and
server for the ad hoc wireless communication network that is selected from the one or more personal communications devices based on the personal communications device with the largest globally unique identifier.

2. The system of claim 1, wherein the plurality of modules further comprise a group manager that permits each personal communications device to create at least one group of one or more other personal communications devices having a group globally unique identifier generated by the library wherein a message may be broadcast to the one or more personal communications devices that are part of a particular group.

3. The system of claim 2, wherein the group manager creates a hierarchically arranged set of groups wherein each group has a precedence with respect to another group in order to determine which group broadcast message takes precedence over another group broadcast message.

4. A method for ad hoc wireless communications between one or more personal communications devices that form an ad hoc wireless communications network, the method comprising:
 providing at least two personal communications device, each device further comprising a processor and a plurality of modules, each module having a plurality of computer instructions executed by the processor to implement the ad hoc wireless communications network, wherein the plurality of modules further comprise a graphical user interface module that generate a user interface;
 generating a globally unique identifier for each personal communications device;
 selecting a personal communications device to act as a server for the ad hoc wireless communications network wherein the personal communications device with a largest globally unique identifier is selected as the server;
 providing security for the ad hoc wireless communications network to a denial of service attack, the security providing further comprising identifying a problem with a particular communication session associated with a particular personal communications device;
 excluding the particular communications session from the wireless communications network;
 determining if the problem associated with the particular communications sessions has exceeded a problem threshold; and
 escalating, if the problem associated with the particular communications sessions has exceeded a problem threshold, the exclusion of the particular communications session.

5. The method of claim 4 further comprising
 creating, at each personal communications device, a group of one or more other personal communications devices having a group globally unique identifier generated by the library; and
 broadcasting a message to the group of one or more other personal communications devices.

6. The method of claim 5 further comprising
 creating at least two groups of one or more other personal communications devices and
 establishing a precedence between the at least two groups in order to determine which group broadcast message takes precedence over another group broadcast message.

7. The method of claim 6, wherein the establishing the precedence further comprises
 retrieving a user defined precedence relationship of the group of devices, the user defined precedence relationship establishing that a communication session of a first group has priority over a communications session of a second group and that the communication session of the second group has priority over a communications session of a third group, and
 automatically determining an implied precedence relationship of the group of devices, the implied precedence relationship establishing that the communications session of the first group has priority over a communications session of a third group based on the previous priority of the communications session of the first group over the communications session of the second group and the previous priority of the communication session of the second group over the communications session of the third group.

8. The method of claim 7, wherein the determining step further comprising utilizing a transitive closure process to determine the implied precedence relationship.

9. The method of claim 7, wherein retrieving the user defined precedence relationships further comprise
 identifying a precedence loop in the user defined precedence, the precedence loop occurs when a precedence of a group relative to another group is not clearly defined by the user defined preferences and
 disabling the precedence relationships forming the precedence loop.

10. The method of claim 9, wherein the retrieving further comprises reactivating the precedence relationships in the precedence loop at a later time when the precedence loop is no longer present in the user defined precedences.

11. The method of claim 4, wherein selecting the server further comprises generating a new server identifier for the selected personal communications device that is communicated to the other personal communications devices in the wireless communications network.

12. The method of claim 11, wherein the identifier further comprises a globally unique random number identifier.

13. The method of claim 4 further comprising selecting a new server when the currently selected server is no longer part of the wireless communications network.

14. The method of claim 4 further comprising periodically selecting a new server for the wireless communications network.

15. The method of claim 14, wherein the periodically selecting a new server further comprises generating a new identifier for each personal communications device prior to selecting a new server.

16. The method of claim 4, wherein the problem threshold further comprises one of a greater than two minute problem duration and the particular communications session has been reinstated more than three times for the same problem.

17. The method of claim 4, wherein the escalation step further comprises excluding a symphone process identification associated with the particular communication session.

18. The method of claim 17, wherein the escalation step further comprises excluding, if the exclusion of the symphone process identification exceeds the problem threshold, an IP address identifier associated with the symphone process identification and the particular communication session.

19. The method of claim 18, wherein the escalation step further comprises excluding, if the exclusion of the IP address identifier exceeds the problem threshold, a personal communications device identifier associated with the IP address identifier, the symphone process identification and the particular communication session.

* * * * *